United States Patent
Hirsch et al.

(10) Patent No.: US 8,597,820 B2
(45) Date of Patent: Dec. 3, 2013

(54) APPARATUS FOR RESTRAINING AN ENERGY STORE

(75) Inventors: Stefan Hirsch, Stuttgart (DE); Tobias Isermeyer, Stuttgart (DE); Markus Kohlberger, Stuttgart (DE); Florin Moldovan, Stuttgart (DE); Michael Moser, Rainau (DE); Heiko Neff, Stuttgart (DE); Thomas Schiehlen, Altheim (DE); Caroline Schmid, Stuttgart (DE); Achim Wiebelt, Deidesheim (DE)

(73) Assignee: Behr GmbH & Co. KG, Stuttgart (DE)

( * ) Notice: Subject to any disclaimer, the term of this patent is extended or adjusted under 35 U.S.C. 154(b) by 0 days.

(21) Appl. No.: 13/366,571

(22) Filed: Feb. 6, 2012

(65) Prior Publication Data

US 2012/0196168 A1    Aug. 2, 2012

Related U.S. Application Data

(63) Continuation of application No. PCT/EP2010/061288, filed on Aug. 3, 2010.

(30) Foreign Application Priority Data

Aug. 5, 2009  (DE) .......................... 10 2009 036 141
Sep. 15, 2009 (DE) .......................... 10 2009 041 348

(51) Int. Cl.
*H01M 6/42* (2006.01)
*H01M 2/00* (2006.01)
(52) U.S. Cl.
USPC ............................. 429/159; 429/151; 429/163
(58) Field of Classification Search
USPC .......................... 429/171, 172, 151, 163, 159
See application file for complete search history.

(56) References Cited

U.S. PATENT DOCUMENTS

| | | | |
|---|---|---|---|
| 1,392,757 A | 10/1921 | Gales | |
| 1,542,821 A | 6/1925 | Bohannon | |
| 2,621,222 A | 12/1952 | Wirth | |
| 4,317,497 A * | 3/1982 | Alt et al. ...................... | 180/68.5 |
| 5,037,711 A * | 8/1991 | Bonnaud et al. .............. | 429/156 |
| 6,224,998 B1 | 5/2001 | Brouns et al. | |
| 6,410,177 B1 * | 6/2002 | Iyasu et al. ................... | 429/434 |
| 6,645,659 B2 * | 11/2003 | Bisaka et al. ................. | 429/454 |

FOREIGN PATENT DOCUMENTS

| | | |
|---|---|---|
| DE | 1 195 377 | 6/1965 |
| DE | 1 280 358 | 10/1968 |
| DE | 27 01 780 | 7/1978 |
| GB | 417060 | 9/1934 |

* cited by examiner

*Primary Examiner* — Patrick Ryan
*Assistant Examiner* — Julian Anthony
(74) *Attorney, Agent, or Firm* — Muncy, Geissler, Olds & Lowe, PLLC

(57) ABSTRACT

A device for restraining an energy store is provided that includes one or more cells disposed between a first side of the energy store and a second side of the energy store vertically opposite to the first side. The device has at least one first mounting device designed for transferring a first clamping force acting in the direction of the second side to the first side of the energy store, and at least one second mounting device designed for transferring a second clamping force acting in the direction of the first side to the second side o the energy store, and at least one elastic clamping device designed for providing the first and second clamping forces and further designed for adapting a distance between the at least one first mounting device and the at least one second mounting device to a permissible distance between the first and the second side.

10 Claims, 10 Drawing Sheets

APPARATUS FOR RESTRAINING AN ENERGY STORE

This nonprovisional application is a continuation of International Application No. PCT/EP2010/061288, which was filed on Aug. 3, 2010, and which claims priority to German Patent Application Nos. DE 10 2009 036 141.3, which was filed in Germany on Aug. 5, 2009, and to DE 10 2009 041 348.0, which was filed in Germany on Sep. 15, 2009 and which are all herein incorporated by reference.

BACKGROUND OF THE INVENTION

1. Field of the Invention

The present invention relates to an apparatus for restraining an energy store, and to an energy store that may be used, for example, in vehicles.

2. Description of the Background Art

Powerful energy stores, such as lithium ion and NiHM batteries or "super caps," are used in modern hybrid electric vehicles or electric vehicles (HEV/EV vehicles). Resistances within and outside the cells cause these energy stores to heat up during rapid charging and discharging. Temperatures above 50° C. permanently damage the energy stores. To ensure the operation of the energy stores, the latter must be actively cooled. For this purpose, the energy stores are brought into thermal contact with a plate through which refrigerant flows and are cooled thereby.

When cooling the cells, it is important for all cells to be cooled uniformly. If cell cooling is not uniform, the cells age at different rates, which has a negative impact on the operation and performance of the energy stores. The described energy stores are furthermore to be mechanically connected to the vehicle in order to ensure secure attachment and to avoid damage to the energy store. In doing so, the forces and accelerations to be applied as well as those which occur must be absorbed and corresponding geometric tolerances of the energy stores bridged.

Modern energy stores usually have simple housings that do not provide an apparatus for attaching them in vehicles. They are therefore usually provided with separate housings or apparatuses that do no meet tolerance compensation requirements when multiple energy stores are used simultaneously, or they are able to do so only by using a comparatively large amount of installation space and/or complex assembly.

DE 27 01 780 B1 describes a battery mount for a motor vehicle battery that is covered by a cover, comprising a mounting apparatus for accommodating the battery and a U-shaped mount spanning the battery which is formed from a horizontal clip which rests at least partially on the upper side of the battery and has vertical clamping parts that are detachably connected to the mounting apparatus.

The commonly used clamping and attachment systems usually require a great deal of installation space and/or assembly work. In addition, compensating any geometrical tolerances that occur is not possible in these systems, or it is possible only to a limited extent, due to the manufacture, assembly, operation, etc. of the energy stores.

SUMMARY OF THE INVENTION

It is therefore an object of the present invention to provide an improved apparatus for restraining an energy store, and to provide an improved energy store.

Clamping and attachment concepts for electrical energy stores and, in particular, the design and embodiment of various clamping and attachment concepts for electrical energy stores which have inherently stable housings on a cooling element or in a housing are the core of the invention.

The concepts according to the invention overcome the disadvantages of current attachment concepts by integrating elastic and compensating elements which ensure both the required forces and the necessary tolerance compensation.

Approaches according to the present invention are proposed which provide clamping forces and tolerance compensation either for each individual cell or for a defined group of cells which are preassembled into a "cell pack." The clamping systems according to the invention may relate to energy stores having inherently stable housings, so-called hardcase cells.

The clamping systems according to an embodiment of the invention may advantageously ensure a small amount of installation space and low weight. In addition, a force introduction and transmission as well as a tolerance compensation may be combined in a single concept. The forces and accelerations to be applied as well as those that occur may also be absorbed, and the corresponding geometric tolerances of the energy stores may be bridged.

The approach according to the invention may furthermore make do without the use of screw connections. Necessary attachments may be provided by hooking, engaging and restraining.

In an embodiment, the present invention provides a device for restraining an energy store having one or a plurality of cells disposed between a first side of the energy store and a second side of the energy store vertically opposite the first side, comprising the following features: at least one first mounting device which is designed to transfer a first clamping force acting in the direction of the second side to the first side of the energy store; at least one second mounting device which is designed to transfer a second clamping force acting in the direction of the first side to the second side of the energy store; and at least one expandable clamping device which is designed to provide the first and the second clamping forces and is furthermore designed to adapt a distance between the at least one first mounting device and the at least one second mounting device to a tolerated distance between the first and the second sides.

The energy store may be based on lithium ion or NiMH batteries or super caps and be suitable for use in hybrid electric vehicles or electric vehicles. Accordingly, the cells may be, for example, galvanic cells. The apparatus according to the invention may represent a connecting element between the energy store and a vehicle part to which the energy store is to be attached. The energy store may be cuboid in shape. The first side may represent an upper side and the second side may represent a lower side of the energy store. The vertical direction may be an orientation of the energy store preferably to be selected. The first and second clamping forces may have the same absolute value but act in opposite directions in relation to the energy store. The clamping forces may permit a secure connection between the mounting devices and the energy stores. In particular, the energy store may be prevented from slipping in relation to the mounting devices, and any forces and accelerations which occur may be both absorbed by the holding devices and transferred thereto. The tolerated distance may be produced by manufacturing-related deviations in the size of the energy store or the individual cells. The expandable clamping device may be elastically expandable in length on the basis of its shape or its material. For example, the clamping device may be designed in a meandering shape or as a bent clamping wire. Due to the expansion, the clamping device may, on the one hand, ensure a tolerance compensation and, on the other hand, provide a restoring force or an elastic force, which counteract the expansion by a contraction acting against the expansion, thus generating the clamping forces. The clamping forces may thus be generated by the fact that the expandable clamping device first expands to a dimension that is greater than will be necessary later on when mounted on the energy store and then contracts to a dimension that is smaller yet still tensioned, in an end position. The vertical length of the expandable clamping device changes due to the expansion and contraction. In particular, the expandable clamping device is not a screw, and the clamping force is not provided via a screw connection. Depending on the specific embodiment, the first and second mounting elements may be connected to each other via the expandable clamping device or by another connecting device. The expandable clamping device and the mounting devices may be permanently connected to each other and, for example, manufactured from a single piece or be a single piece. Alternatively, the expandable clamping device may be hooked to the mounting devices.

At least one of the mounting devices may be designed as a hook which may be hooked to the corresponding side for transferring the clamping force. Unintentional detachment of the hook may be prevented by the clamping force.

At least one of the mounting devices may furthermore be designed as a mounting plate which may rest on the corresponding side for transferring the clamping force. A mounting plate of this type permits an even distribution of the application of force over the surface of the energy store.

According to an embodiment, the expandable clamping device may be disposed between the first and the second mounting devices and be connected to both the first mounting device and the second mounting device. By expansion of the expandable clamping device, the distance between the first and second mounting devices may be increased and thus adapted to different dimensions and, in particular, different heights of different energy stores. The clamping forces may be provided by tightening the expandable clamping device.

At least one of the mounting devices may be designed as a circular spring which may be hooked to the corresponding side for transferring the clamping force. The circular spring may provide the clamping force as well as permit a tolerance compensation. The circular spring may thus comprise at least one of the at least one expandable clamping devices. Depending on the specific embodiment, additional connecting elements or additional expandable clamping devices may be provided between the first and second mounting elements.

According to an embodiment, the apparatus may comprise a plurality of first mounting devices, a plurality of second mounting devices, at least two expandable clamping devices and a horizontally disposed connecting web which is connected to the plurality of first mounting devices or the plurality of second mounting devices. The connecting web may run horizontally over a third side of the energy store, which is disposed between a fourth and a fifth side, and have a first attachment device for attaching the connecting web to the fourth side and a second attachment device to attach the connecting web to the fifth side.

The third, fourth and fifth sides may be disposed between the first and second sides, the third side being disposable between the fourth and fifth sides. The apparatus according to the present invention may completely span the third side. The connecting web may be disposed in an upper area or in a lower area of the third side. Multiple connecting webs may also be disposed, for example, in an upper area and in a lower area of the third side. The connecting web permits the apparatus according to the invention to be attached to the side of the energy store.

According to an embodiment, the connecting web may be disposed between the two expandable clamping devices and the plurality of first mounting devices or the plurality of second mounting devices. The connecting web may thus provide a connection between adjacent mounting devices and adjacent expandable clamping devices and thus have a stabilizing effect.

The at least two expandable clamping devices may also be disposed parallel to each other, and a vertical web that is connected to the connecting web may be connected between two adjacent expandable clamping devices.

The vertical web may have a bent area on an end facing the connecting web, so that another area of the vertical web and the at least two expandable clamping devices are disposed between the third side and the connecting web. The bent area may be a 180-degree bend or fold. The connecting web permits a further stabilization of the configuration according to the invention by the fact that the connecting web spans the expandable clamping devices running in the vertical direction.

The apparatus according to an embodiment of the invention may also comprise an attachment device which is designed to permit an attachment of the energy store to a vehicle part or to a cooling plate provided for cooling or heating the energy store. The energy store may thus be mounted in a vehicle via the apparatus according to the invention.

The present invention furthermore provides an energy store which has one or a plurality of cells and a restraining apparatus according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
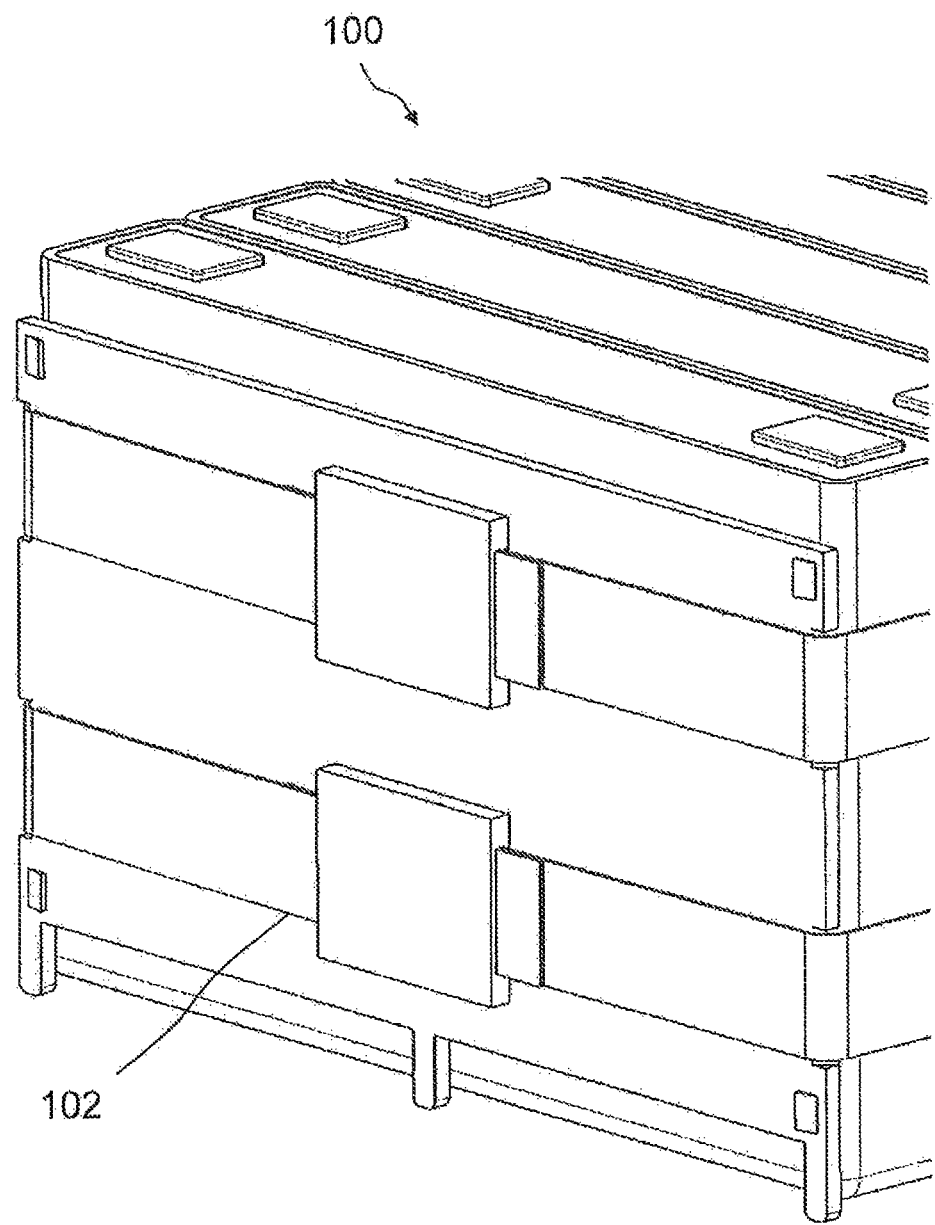
FIG. 1 shows a horizontal restraining system of a cell module.

In the following description of the preferred exemplary embodiments of the present invention, identical or similar reference numerals are used for the elements illustrated in the different drawings and having a similar function, these elements not being described repeatedly.

The concepts and approaches described in this patent application are practical embodiments according to technical feasibility. However, corresponding variations, due to the geometric design of the energy store housing or the cooling components, are also conceivable. In cases of doubt, an application-specific design of the concepts presented here is required.

FIG. 1 shows an energy store 100 in the form of a cell module, and a horizontal restraint 102 of the cell module for stabilization purposes and for increasing cell life.

Figure 2:
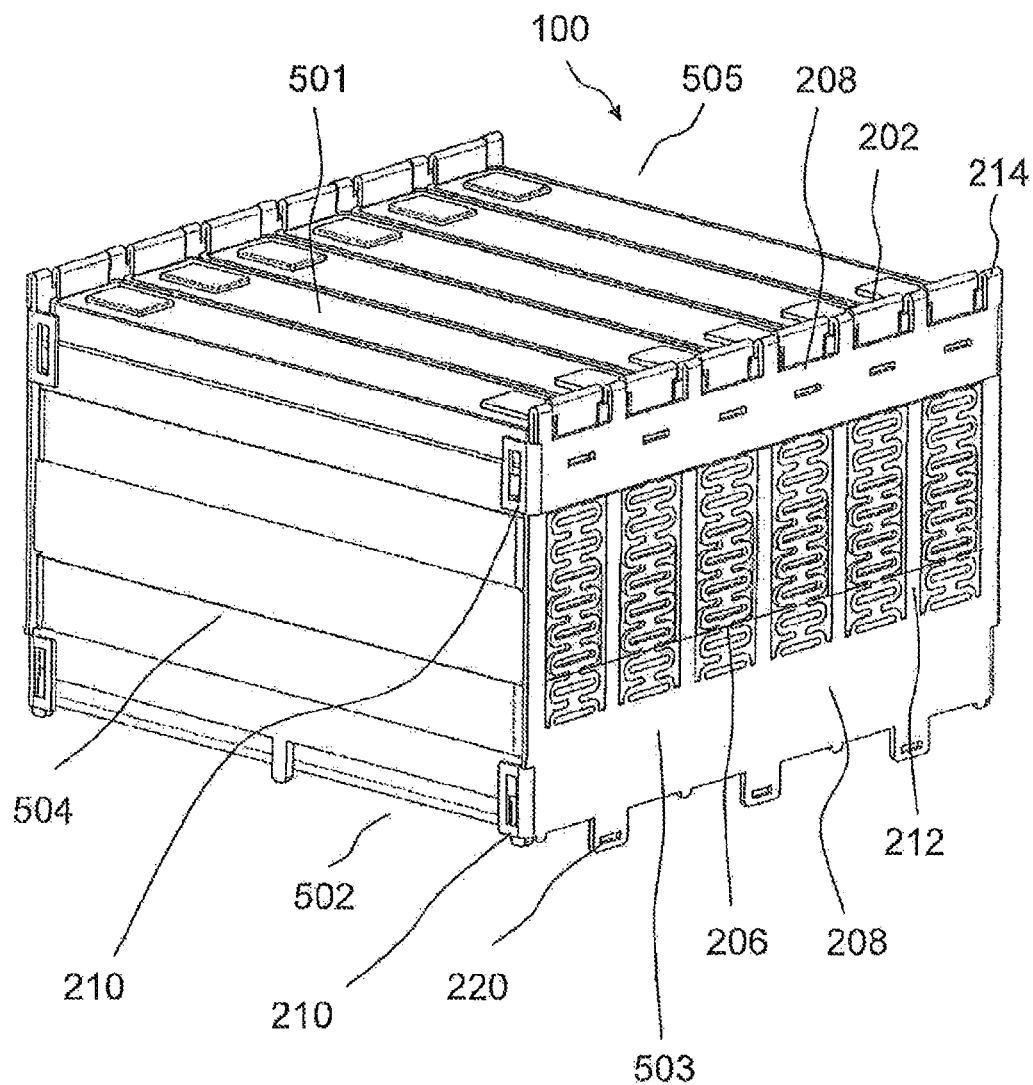
FIG. 2 shows a clamping concept according to an exemplary embodiment of the present invention.

FIG. 2 shows an energy store 100 having a restraining apparatus, according to an exemplary embodiment of the present invention. Energy store 100 has an upper side and a lower side. The restraining apparatus is disposed on an end face situated between the upper side and the lower side.

The restraining apparatus has a plurality of first mounting devices 202, a plurality of expandable clamping devices 206, a first and a second horizontally disposed connecting web 208, side attachment devices 210, vertical webs 212 having bent areas 214 as well as attachment devices 220. Expandable clamping devices 206, horizontally disposed connecting web 208 and vertical webs 212 may be disposed parallel to the end face of the energy store.

First mounting devices 202 are disposed along an edge area of the upper side. First mounting devices 202 may be designed as hooks which may be used to attach the restraining apparatus to the upper side. Similarly to first mounting devices 202, second mounting devices may be disposed along the lower side.

Clamping devices 206 may be disposed parallel to each other and form a connection between first mounting devices 202 and the second mounting devices. Clamping devices 206 may be designed as elastic expansion strips, expansion elements or spring elements.

According to this exemplary embodiment, a lower horizontal connecting web 208 is disposed between clamping devices 206 and the second mounting devices. A side attachment device 210 disposed on lower horizontal connecting web 208 may represent an bent projection of connecting web 208 which adjoins an adjacent end face of energy store 100. Side attachment device 210 may have a through-opening with which the projection extending beyond the adjacent end face may engage.

Bent areas 214 of vertical webs 212 are connected to an upper horizontal connecting web 208. A side attachment device 210 disposed on upper horizontal connecting web 208 may be designed similarly to lower side attachment device 210. Upper horizontal connecting web 208 may span clamping devices 206. Attachment devices 220 may be formed by projections of lower horizontal connecting web 208, these projections extending beyond the lower side of energy store 100.

First and second mounting devices 202 permit a vertical attachment of the restraining apparatus, and side attachment devices 210 permit a horizontal attachment of the restraining apparatus. Due to a restoring force of expanded clamping devices 206, first and second mounting devices 202 are drawn against the upper side and lower side, respectively, of energy store 100. Expanded clamping devices 206 may thus provide a corresponding clamping force. The expansion of clamping devices 208 furthermore permits a variable vertical length of the restraining apparatus. In this manner, a distance between the first and second mounting devices may be adapted to a particular height of energy store 100.

Figure 3:
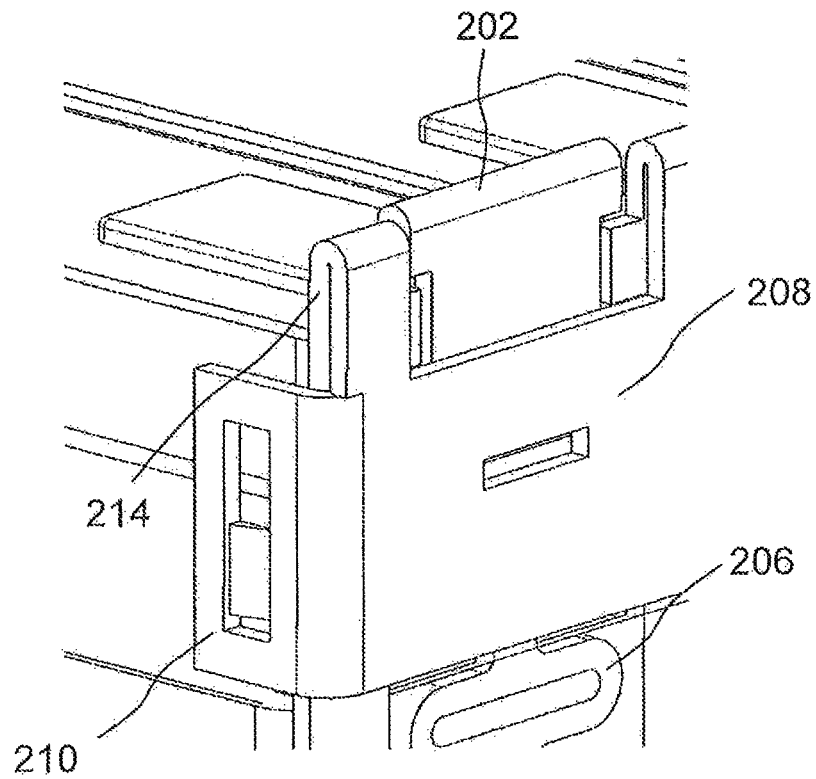
FIG. 3 shows a detailed view of a clamping concept according to the invention.
Figure 4:
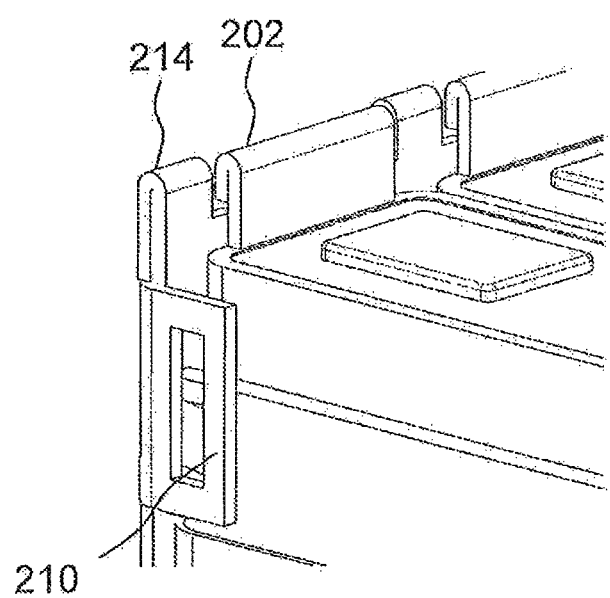
FIG. 4 shows a detailed view of a clamping concept according to the invention.

FIGS. 3 and 4 each show a detailed view of the clamping concept illustrated in FIG. 2, including a representation of the clamping housing of the clamping element as well as a possible assembly device in the form of an engagement mechanism.

Figure 5:
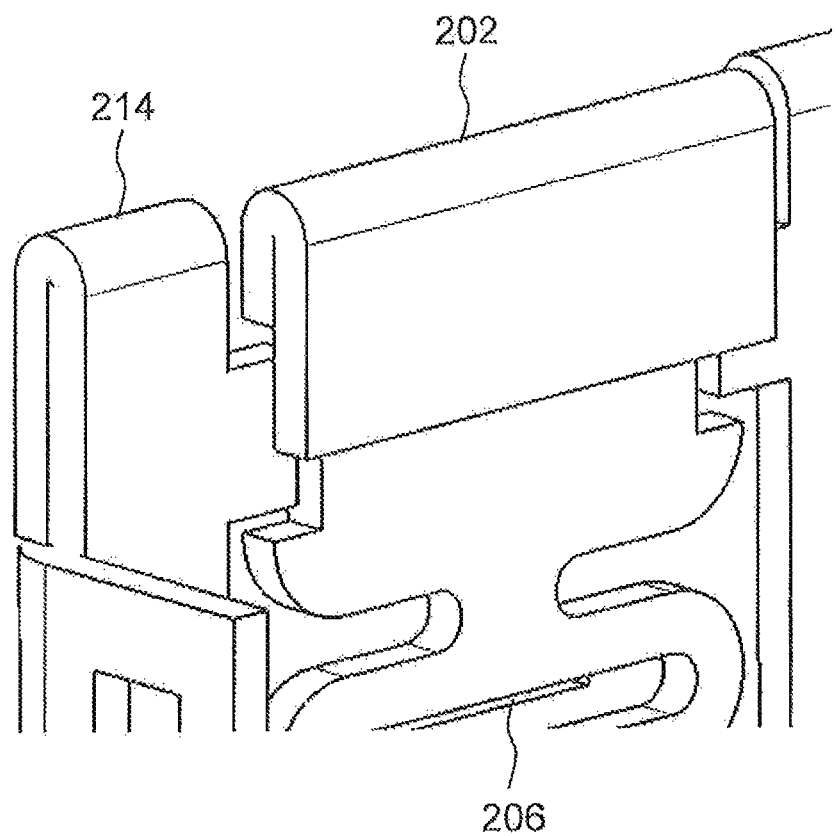
FIG. 5 shows a representation of a clamping hook having an expansion element according to an exemplary embodiment of the present invention.

FIG. 5 shows a detailed view of the clamping concept illustrated in FIG. 2, including a clamping hook 202 and an expansion element 206 for transmitting force, as well as an integrated stop. Clamping hook 202 may engage with corresponding mating pieces on the surface or the end face of the energy store.

Figure 6:
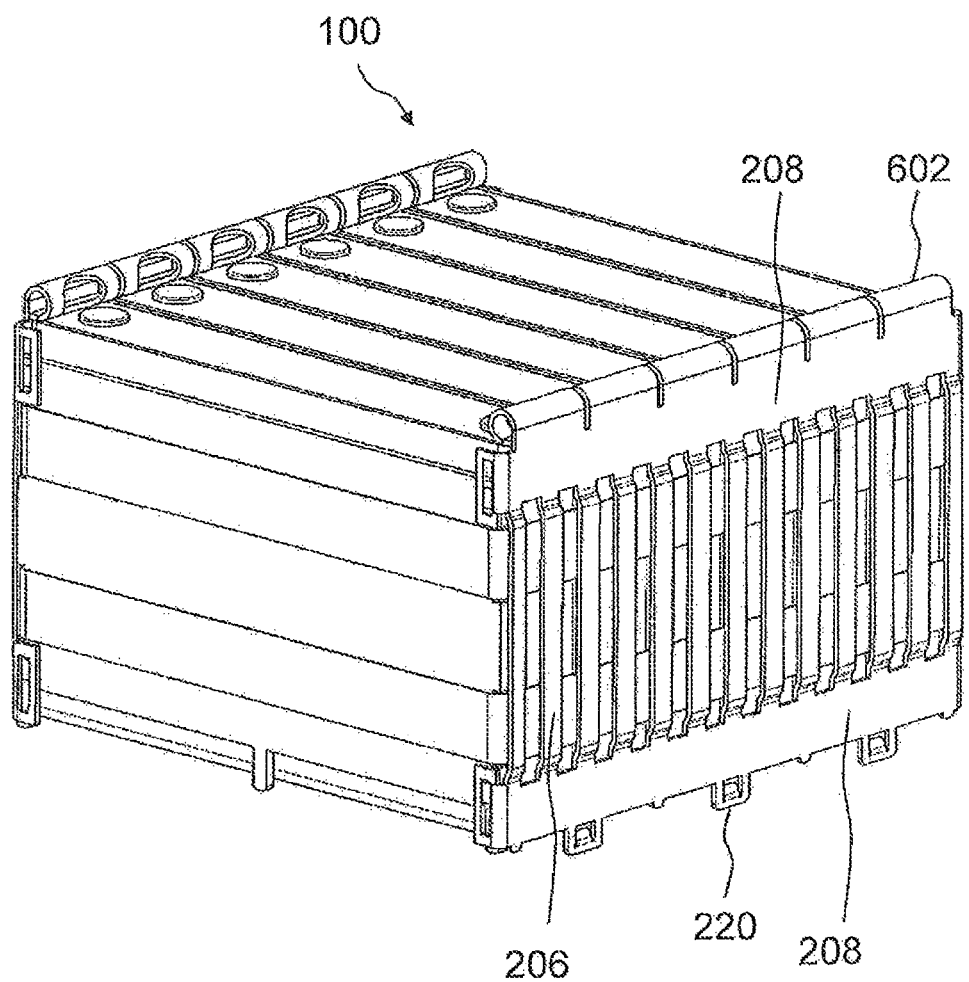
FIG. 6 shows a cell module having side clamping elements, according to an exemplary embodiment of the present invention.

FIG. 6 shows an energy store 100 having a restraining apparatus, according to another exemplary embodiment of the present invention. A complete cell module 100 having side clamping elements 206 is illustrated, it being possible to perform a clamping action via "circular springs" 602.

According to this exemplary embodiment, first mounting devices 602 are designed as circular springs which rest on an edge area of the upper side of energy store 100. Due to circular springs 206, a clamping force may be applied to the upper side of energy store 100, and the vertical length of the restraining apparatus may also be adapted.

Figure 7:
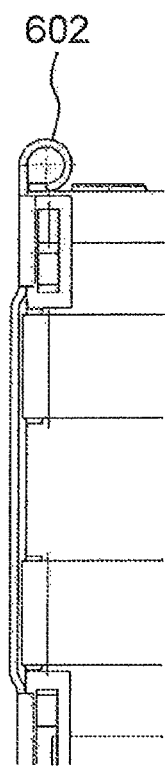
FIG. 7 shows a detailed view of a clamping concept according to the invention.
Figure 8:
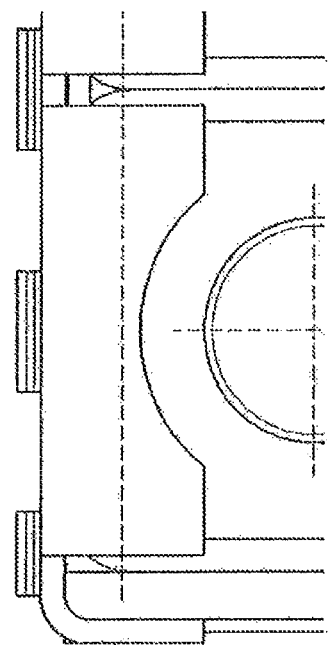
FIG. 8 shows a detailed view of a clamping concept according to the invention.

FIGS. 7 and 8 each show a detailed view of the clamping concept illustrated in FIG. 6.

Figure 9:
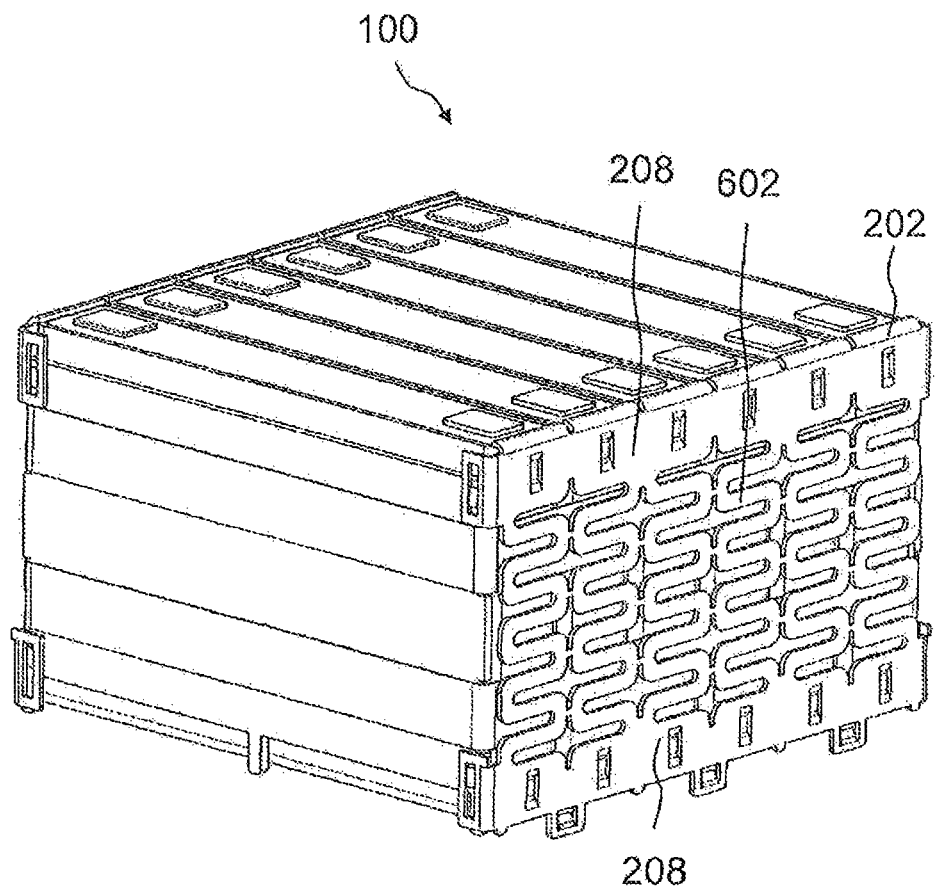
FIG. 9 shows a cell module having side clamping elements, according to another exemplary embodiment of the present invention.

FIG. 9 shows an energy store 100 having a restraining apparatus, according to another exemplary embodiment of the present invention. As an alternative to the circular springs illustrated in FIG. 6, clamping elements 206 of a meandering shape are used. First mounting devices 202 may be designed as hooks which may engage with the upper side.

Clamping elements 206 may be disposed between an upper and a lower horizontal connecting web 208. Upper horizontal connecting web 208 may be permanently connected to first mounting devices 202, and lower horizontal connecting web 208 may be permanently connected to the second mounting devices, on the lower side of energy store 100. For example, mounting devices 202 may present bent projections of connecting webs 208. Likewise, clamping elements 206 may present projections of connecting webs 208. Mounting devices 202, connecting webs 208 and clamping elements 206 may thus be manufactured from a single part, for example a metal sheet.

Figure 10:
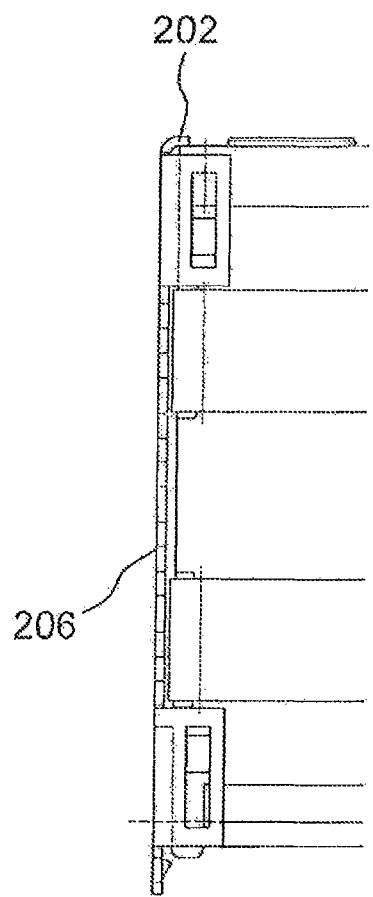
FIG. 10 shows a detailed view of a clamping concept according to the invention.
Figure 11:
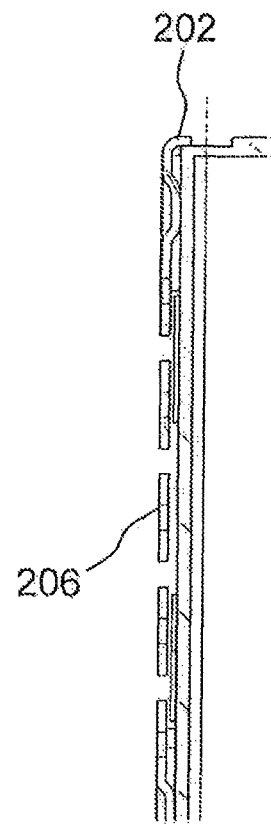
FIG. 11 shows a detailed view of a clamping concept according to the invention.

FIGS. 10 and 11 each show a detailed view of the clamping concept illustrated in FIG. 6.

Figure 12:
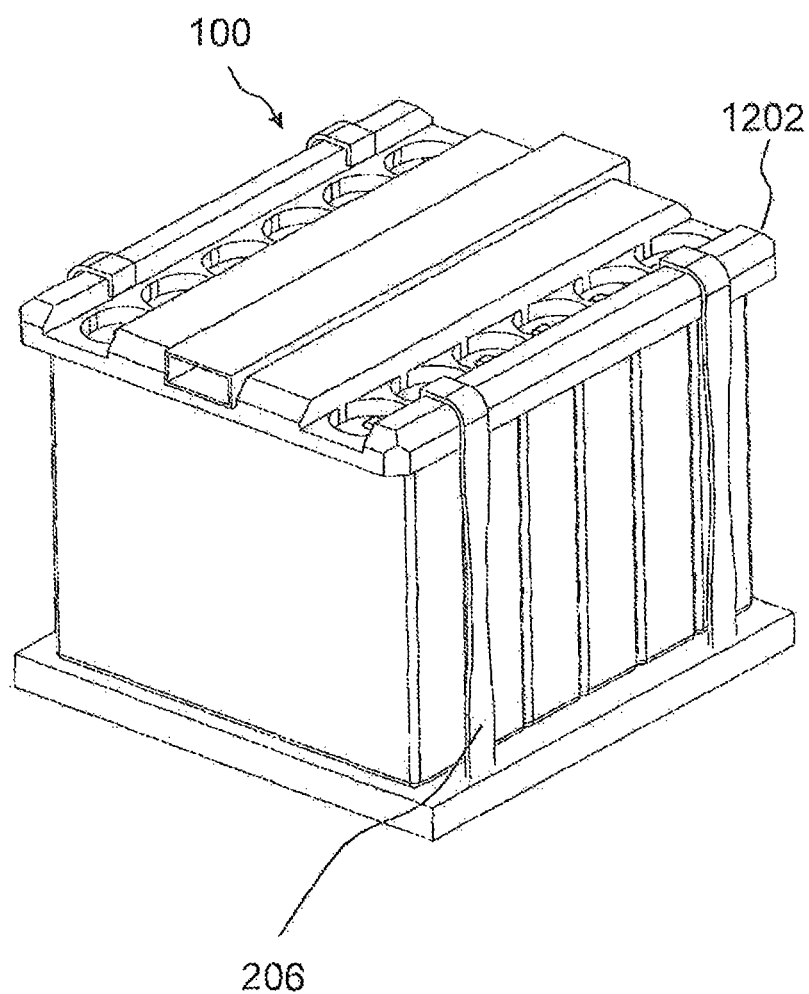
FIG. 12 shows a clamping concept having an upper mounting plate, according to another exemplary embodiment of the present invention.

FIG. 12 shows an energy store 100 having a restraining apparatus, according to another exemplary embodiment of the present invention. An alternative clamping concept is illustrated which has an upper mounting plate 1202 for equalizing the contact pressure as well as side clamping/expansion elements 206. Mounting plate 1202 may span the upper side of energy store 100. Clamping devices 206 may be guided through openings in mounting plate 1202 and be hooked thereto. Clamping devices 206 may be fixedly connected to a lower mounting plate on the lower side.

Figure 13:
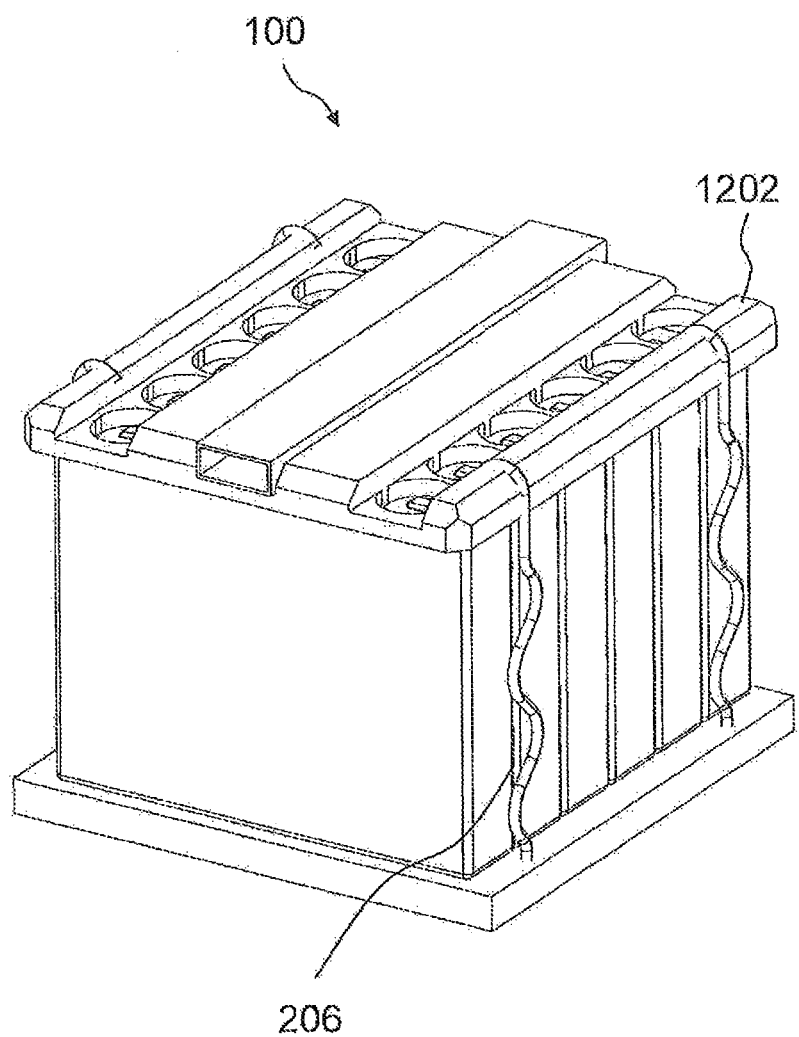
FIG. 13 shows a clamping concept having an upper mounting plate, according to another exemplary embodiment of the present invention.

FIG. 13 shows an energy store 100 having a restraining apparatus, according to another exemplary embodiment of the present invention. In contrast to the exemplary embodiment illustrated in FIG. 12, clamping devices 206 are designed as bent clamping wires.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for restraining an energy store, the device comprising:
   one or a plurality of cells disposed between a first side of the energy store and a second side of the energy store vertically opposite the first side;
   at least one first mounting device that is configured to transmit a first clamping force acting in a direction of the second side to the first side of the energy store;
   at least one second mounting device that is configured to transmit a second clamping force acting in the direction of the first side to the second side of the energy store; and
   at least one expandable clamping device that is configured to provide the first and second camping forces and is configured to adapt a distance between the at least one first mounting device and the at least one second mounting device to a tolerated distance between the first and second sides,
   wherein at least one of the mounting devices is configured as a hook which is hooked to the corresponding side for transferring the clamping force.

2. A device for restraining an energy store, the device comprising:
   one or a plurality of cells disposed between a first side of the energy store and a second side of the energy store vertically opposite the first side;
   at least one first mounting device that is configured to transmit a first clamping force acting in a direction of the second side to the first side of the energy store;
   at least one second mounting device that is configured to transmit a second clamping force acting in the direction of the first side to the second side of the energy store; and
   at least one expandable clamping device that is configured to provide the first and second clamping forces and is configured to adapt a distance between the at least one first mounting device and the at least one second mounting device to a tolerated distance between the first and second sides,
   wherein at least one of the mounting devices is configured as a circular spring that is hooked to the corresponding side for transferring the clamping force.

3. The device according to claim 2, wherein the circular spring includes at least one of the at least one expandable clamping devices.

4. A device for restraining an energy store, the device comprising:
   one or a plurality of cells disposed between a first side of the energy store and a second side of the energy store vertically opposite the first side;
   at least one first mounting device that is configured to transmit a first clamping force acting in a direction of the second side to the first side of the energy store;
   at least one second mounting device that is configured to transmit a second clamping force acting in the direction of the first side to the second side of the energy store; and
   at least one expandable clamping device that is configured to provide the first and second clamping forces and is configured to adapt a distance between the at least one first mounting device and the at least one second mounting device to a tolerated distance between the first and second sides,
   the device further comprising:
   a plurality of first mounting devices;
   a plurality of second mounting devices;
   at least two expandable clamping devices;
   a horizontally disposed connecting web that is connectable to the plurality of first mounting devices or the plurality of second mounting devices, and the connecting web running horizontally over a third side of the energy store disposed between a fourth side and a fifth side; and
   a first attachment device for attaching the connecting web to the fourth side and a second attachment device for attaching the connecting web to the fifth side.

5. The device according to claim 4, wherein the connecting web is disposed between the at least two expandable clamping devices and the plurality of first mounting devices or the plurality of second mounting devices.

6. The device according to claim 4, wherein the at least two expandable clamping devices are disposed parallel to each other, and wherein a vertical web that is connected to the connecting web is disposed between two adjacent expandable clamping devices.

7. The device according to claim 6, wherein the vertical web has a bent area on an end facing the connecting web, so that another area of the vertical web and the at least two expandable clamping devices are disposed between the third side and the connecting web.

8. A device for restraining an energy store, the device comprising:
   one or a plurality of cells disposed between a first side of the energy store and a second side of the energy store vertically opposite the first side;
   at least one first mounting device that is configured to transmit a first clamping force acting in a direction of the second side to the first side of the energy store;
   at least one second mounting device that is configured to transmit a second clamping force acting in the direction of the first side to the second side of the energy store; and
   at least one expandable clamping device that is configured to provide the first and second clamping forces and is configured to adapt a distance between the at least one first mounting device and the at least one second mounting device to a tolerated distance between the first and second sides,
   wherein the at least one expandable clamping device comprises an elastic clamping device.

9. A device for restraining an energy store, the device comprising:
   one or a plurality of cells disposed between a first side of the energy store and a second side of the energy store vertically opposite the first side;
   at least one first mounting device that is configured to transmit a first clamping force acting in a direction of the second side to the first side of the energy store;
   at least one second mounting device that is configured to transmit a second clamping force acting in the direction of the first side to the second side of the energy store; and at least one expandable clamping device that is configured to provide the first and second clamping forces and is configured to adapt a distance between the at least one first mounting device and the at least one second mounting device to a tolerated distance between the first and second sides, the device further comprising:
- a plurality of first mounting devices;
- a plurality of second mounting devices;
- at least two expandable clamping devices; and
- a horizontally disposed connecting web that is connectable to the plurality of first mounting devices or the plurality of second mounting devices.

10. The device according to claim 9, wherein the connecting web extends horizontally over a third side of the energy store.

* * * * *